United States Patent [19]
Kakehi et al.

[11] Patent Number: 6,029,982
[45] Date of Patent: Feb. 29, 2000

[54] WHEELED VEHICLE FOR MOVEMENT ON ESCALATORS

[75] Inventors: Toru Kakehi; Yasuhiko Eguchi, both of Neyagawa, Japan

[73] Assignee: EXEDY Corporation, Neyagawa, Japan

[21] Appl. No.: 08/949,453

[22] Filed: Oct. 14, 1997

[30]  Foreign Application Priority Data

Oct. 11, 1996 [JP] Japan .................................. 8-270064
Oct. 11, 1996 [JP] Japan .................................. 8-270065

[51] Int. Cl.[7] .................. B60R 19/02; B62B 5/02
[52] U.S. Cl. .................. 280/5.2; 280/DIG. 10; 180/907; 180/908
[58] Field of Search .................. 280/5.2, 5.24, 280/5.32, DIG. 10, 33.992, 33.994, 755, 757, 762; 180/907, 908; 293/131, 136

[56] References Cited

U.S. PATENT DOCUMENTS

| | | | |
|---|---|---|---|
| 2,823,042 | 2/1958 | Gelbond | 280/5.24 |
| 3,272,527 | 9/1966 | Martin | 280/33.994 |
| 4,132,423 | 1/1979 | Chant | 280/DIG. 10 |
| 4,639,002 | 1/1987 | Karpisek | 280/5.2 |
| 5,516,127 | 5/1996 | Glazer et al. | 280/5.2 |
| 5,868,402 | 2/1999 | Eguchi et al. | 280/5.2 |

FOREIGN PATENT DOCUMENTS

| | | |
|---|---|---|
| 6 937 384 | 11/1970 | Germany . |
| 7 047 066 | 12/1970 | Germany . |
| 25 34 332 | 7/1978 | Germany . |
| 84/04451 | 11/1984 | WIPO . |

*Primary Examiner*—Peter C. English
*Attorney, Agent, or Firm*—Shinjyu An Intellectual Property Firm

[57] ABSTRACT

A powered vehicle is configured to stably and reliably ride on an escalator and includes a vehicle body (1), front and rear wheels (2) and (3), a drive mechanism (42), and front and rear supports (4) and (5). The front and rear wheels (2) and (3) are supported on front and rear portions of the vehicle body, respectively. The drive mechanism (42) drives the rear wheels. The front and rear supports (4) and (5) are arranged adjacent to the corresponding front wheels (2) and behind the rear wheels (3), respectively. The front or rear supports (4) and (5) land on the step surface at least when the vehicle body (1) is inclined at a maximum inclination portion of the escalator. At this time, the wheels (2) or (3) remote from the landed supports (5) or (4) land on another step of the escalator.

6 Claims, 16 Drawing Sheets

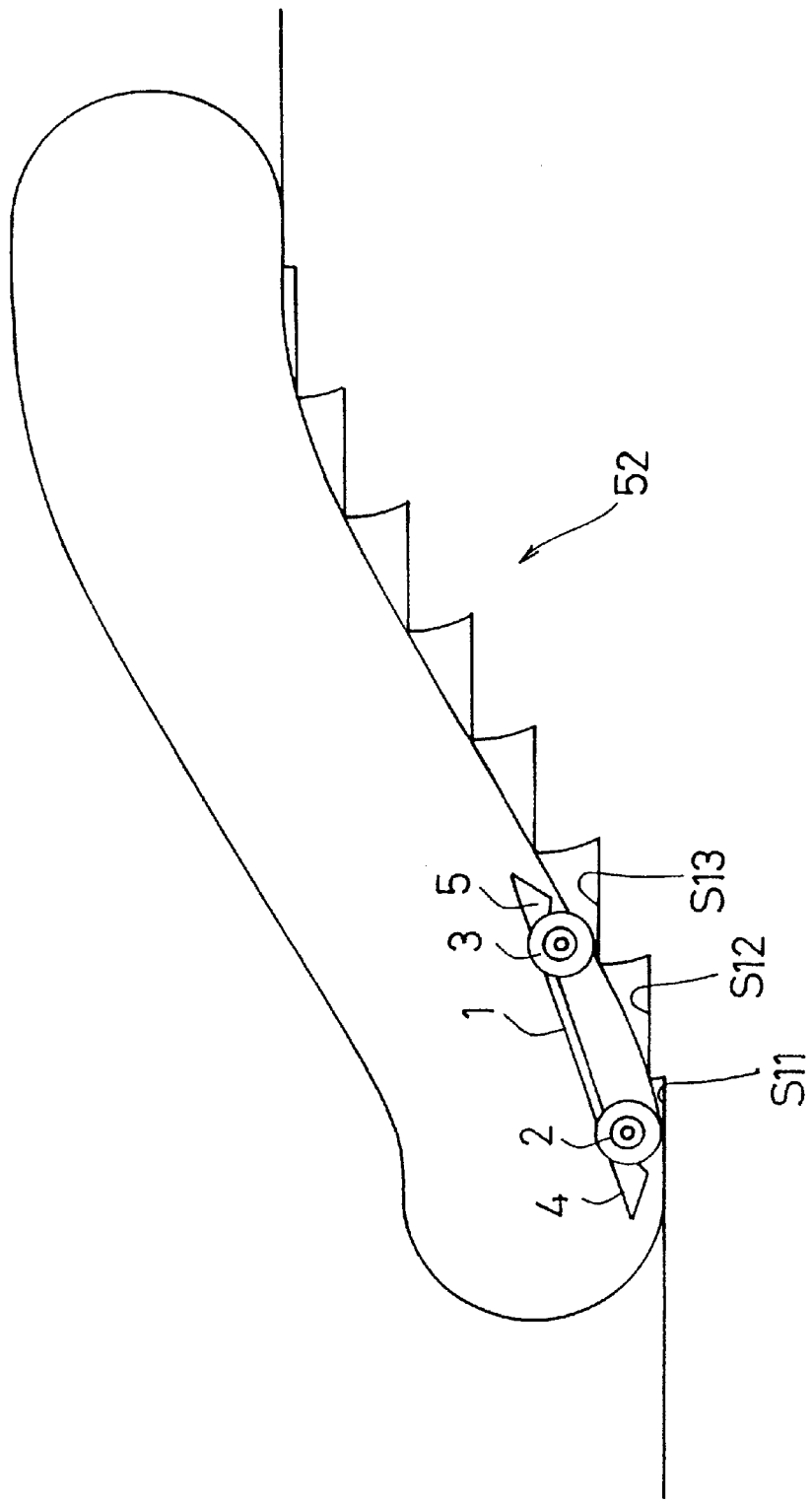

WHEELED VEHICLE FOR MOVEMENT ON ESCALATORS

BACKGROUND OF THE INVENTION

A. Field of the Invention

The present invention relates to a vehicle, and in particular to a vehicle which can be inclined on an inclined portion of an escalator and can ride up and down on a plurality of moving steps of the escalator.

B. Description of the Background Art

There have been proposed various kinds of powered and motorized vehicles which have upper portions for carrying drivers and can ascend and descend stairs. For example, a powered vehicle of a crawler type has been proposed. This type of vehicle has a plurality of wheels at a lower portion of a vehicle body, and endless caterpillar belts are retained around the wheels. The vehicle of the crawler type has hooks, claws or the like at the outer surfaces of the caterpillar belts for moving up and down the stairs by rotation of the caterpillar belts. Another type of vehicle has also been proposed. This vehicle is provided with vertically movable front, rear and auxiliary wheels, of which vertical positions are controlled for ascending and descending the stairs.

All the aforementioned vehicles have structures for ascending and descending the stairs but are not designed to withstand movement on an escalator. Escalators typically have steps with a limited width, and such vehicles cannot generally ride on only one step. Therefore, the aforementioned vehicles carried by the escalator must ride on a plurality of steps, so that the body of the vehicle inclines at an angle corresponding to the inclination angle of the escalator.

When the body of the vehicle of the crawler type or the like inclines, middle portions of the caterpillar belts are brought into contact with a corner of the steps of the escalator. This reduces a contact area of the caterpillar belt, and therefore the vehicle cannot be carried stably. Also, the vehicle having the vertically movable front, rear and auxiliary wheels suffers in that the front and rear wheels ride on different steps, respectively. Therefore, the vehicle may slip downward if the front and rear wheels are not braked sufficiently.

SUMMARY OF THE INVENTION

An object of the invention is to provide a powered vehicle which can stably and reliably ride on an escalator.

In accordance with one aspect of the present invention, a powered vehicle is capable of riding on a plurality of steps of an escalator. The powered vehicle includes a vehicle body and a plurality of wheels. The wheels include a pair of front wheels disposed at a front portion of the vehicle body and a pair of rear wheels disposed at a rear portion of the vehicle body, respectively. The powered vehicle also includes a drive means for driving at least one pair of the pairs of front and rear wheels. Front supports are fixed to front portions of the vehicle body in front of the front wheels. Rear supports are fixed to rear portions of the vehicle body behind the rear wheels. The front and rear supports are configured such that one of the front and rear supports is brought into contact with a step surface of an escalator when the vehicle body is inclined at a maximum inclination portion of an escalator. In response to one of the front and rear supports being brought into contact with the step surface of the escalator a pair of the wheels adjacent to the other of the front and rear supports contacts another step surface of the escalator with the vehicle body inclined at the maximum inclination portion of the escalator.

Preferably, each of the front and rear supports includes a first landing portion configured for contact with a step surface of an ascending escalator, and a second landing portion configured for contact with a step surface of a descending escalator.

Preferably, each of the first and second landing portions of the front and rear supports includes a shock absorbing mechanism for absorbing shock.

In accordance with another aspect of the present invention, a powered vehicle is capable of riding on a plurality of steps of an escalator inclined at least at a maximum inclination portion of the escalator, and includes a vehicle body and front and rear wheels arranged at front and rear portions of the vehicle body, respectively. Drive means for driving at least one of the front and rear wheels is also included. A support is configured for contact with a step surface of an escalator with the vehicle body inclined on a maximum inclination portion of an escalator. A shock absorbing means is disposed within the support for absorbing shock caused by contact between the support and the escalator.

Preferably, the support includes a first landing portion configured for contacting a step surface of an ascending escalator, and a second landing portion configured for contacting a step surface of descending escalator.

Preferably, the shock absorbing means includes a first shock absorber for absorbing a shock applied substantially perpendicularly to the vehicle body, a second shock absorber for absorbing a shock applied substantially perpendicular to the first landing portion, and a third shock absorber for absorbing a shock applied substantially perpendicular to the second landing portion.

Preferably, the support includes a front support disposed on a front portion of the vehicle body in front of the front wheel. The front support has a landing portion configured for contacting a step surface of a moving escalator. The rear wheel is configured to simultaneously contact another step surface of the escalator with the vehicle body inclined on the maximum inclination portion of the escalator. A rear support is disposed on a rear portion of the vehicle body in back of the front wheel. The rear support has a landing portion configured for contacting a step surface of a moving escalator. The front wheel is configured to simultaneously contact another step surface of the escalator with the vehicle body inclined on the maximum inclination portion of the escalator.

Preferably, the shock absorbing means has a first shock absorber for absorbing a shock applied substantially perpendicular to the vehicle body, a second shock absorber for absorbing a shock applied substantially perpendicularly to the landing portion of the front support, and a third shock absorber for absorbing a shock applied substantially perpendicularly to the landing portion on the rear support.

The foregoing and other objects, features, aspects and advantages of the present invention will become more apparent from the following detailed description, when taken in conjunction with the accompanying drawings.

BRIEF DESCRIPTION OF THE DRAWINGS

FIG. 17 is a diagram showing the powered vehicle depicted in FIGS. 1 and 2 on the descending escalator.

DESCRIPTION OF THE PREFERRED EMBODIMENTS

Figure 1:
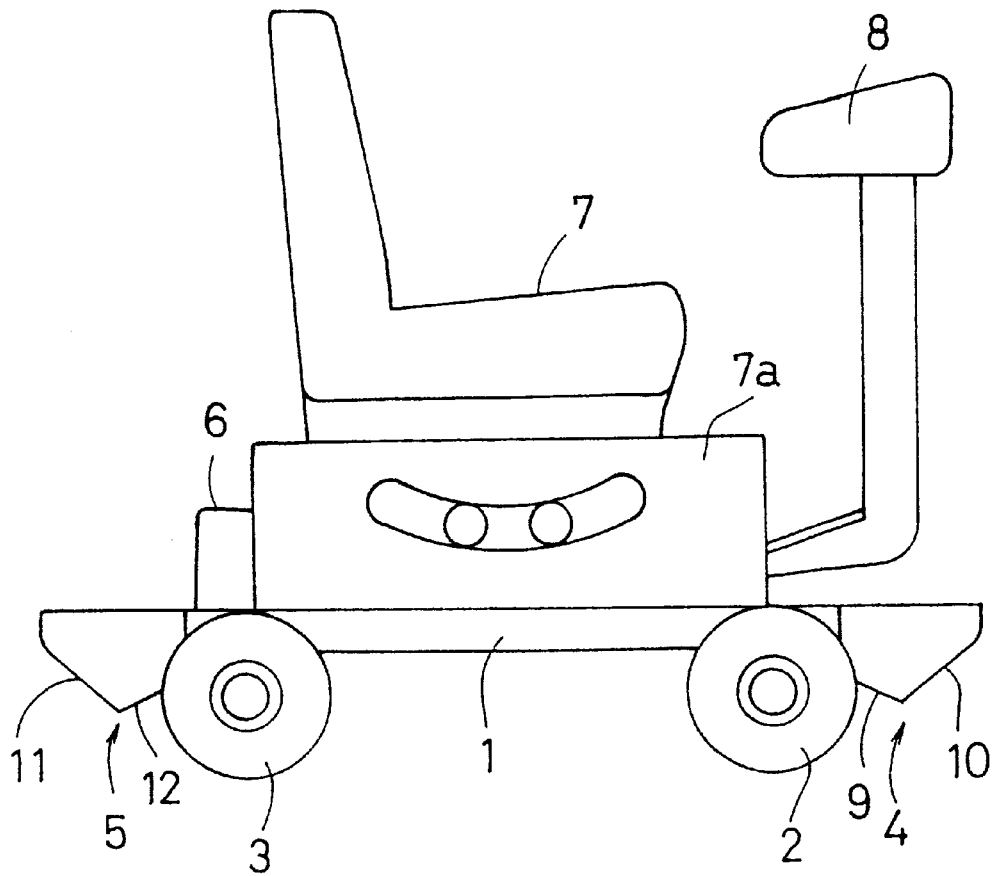
FIG. 1 is a side elevational view of a powered vehicle in accordance with one embodiment of the present invention.
Figure 2:
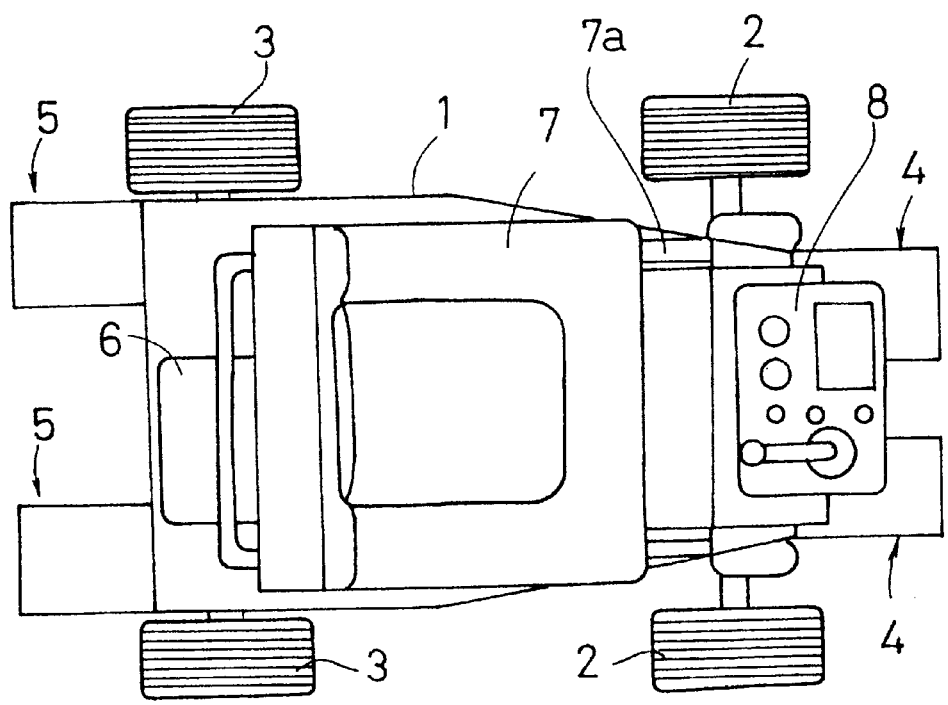
FIG. 2 is a top elevational view of the powered vehicle depicted in FIG. 1.

A powered vehicle according to one embodiment of the present invention is described below with reference to the drawings. Referring to FIGS. 1 and 2, the powered vehicle has a body 1, left and right front wheels 2 supported on a front portion of the bottom surface of the vehicle body 1, left and right rear wheels 3 supported on a rear portion of the bottom surface of the vehicle body 1, front supports 4 attached to left and right sides of the front end of the vehicle body 1, and rear supports 5 attached to the left and right ends of the rear end of the vehicle body 1. A control panel 8 is attached to an upper portion of the vehicle body 1. The front wheels 2 can be steered for direction control by a steering mechanism on the control panel 8.

The rear wheels 3 can be driven in either of the forward and rearward directions by a drive motor 6 which is fixed to the vehicle body 1. A seat unit 7 and the control panel 8 are arranged at the upper surface of the body 1. The seat unit 7 and the control panel 8 are integrally and swingably carried by a seat support unit 7a so that they may move to a generally horizontal position independently of an inclination of the vehicle body 1. The control panel 8 is provided with a main switch, a control lever for controlling a moving speed, a moving direction (forward or rearward direction) and steering angles of the front and rear wheels, a brake switch, other switches and buttons, and a display.

The front and rear supports 4 and 5 are configured, as described below, to selectively land on a step surface of an escalator for supporting the body 1 when the vehicle body 1 moves onto the escalator. The front supports 4 support the front portion of the vehicle body 1, and each have a first landing surface 9 which can landed on the step surface of the ascending escalator, and a second landing surface 10 which can be landed on the step surface of the descending escalator. The rear supports 5 support the rear portion of the body 1, and each have a first landing surface 11 which can be landed on the step surface of the ascending escalator, and a second landing surface 12 which can be landed on the step surface of the descending escalator.

Figure 3:
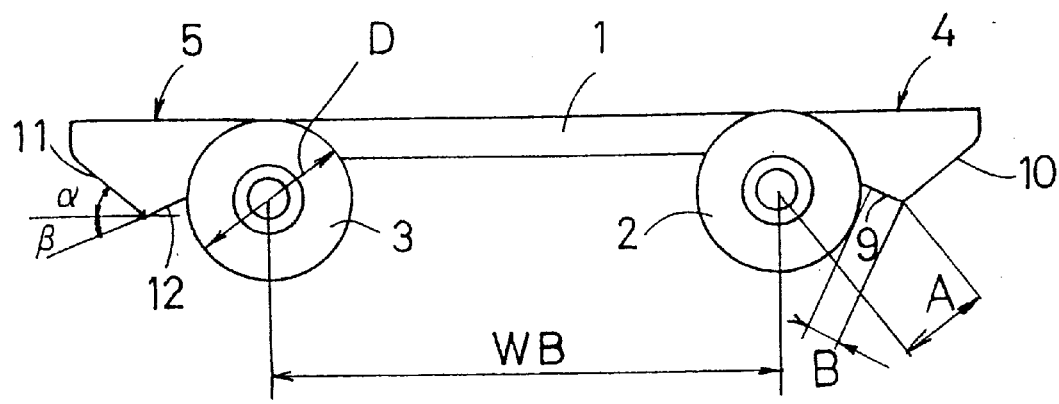
FIG. 3 is a side schematic representation of portions of the vehicle depicted in FIGS. 1 and 2.

The front and rear wheels 2 and 3 as well as the front and rear supports 4 and 5 have dimensions which are predetermined in accordance with dimensions of most standardized escalators. As shown in FIG. 3, a distance (wheel base) WB is defined between the front and rear wheels 2 and 3. Also, a distance A is defined extending from the center of the front wheel 2 to a boundary between the landing surfaces 9 and 10. The distance A is the same when measured from the center of the rear wheel 3 to the boundary between the landing surfaces 11 and 12. A distance B is defined between the outer periphery of the front wheel 2 and the boundary between the landing surfaces 9 and 10. The distance B is the same when measured from the outer periphery of the rear wheel 3 to the boundary between the landing surfaces 11 and 12.

The second landing surface 10 of the front support 4 defines an angle $\alpha$ with respect to the horizontal plane. Similarly, the first landing surface 11 of the rear support 5 also defines the same angle a with respect to the horizontal plane. The first landing surface 9 of the front support 4 and the second landing surface 12 of the rear support 5 each define an angle $\beta$ with respect to the horizontal plane. The front and rear wheels 2 and 3 have a diameter D.

Figure 4:
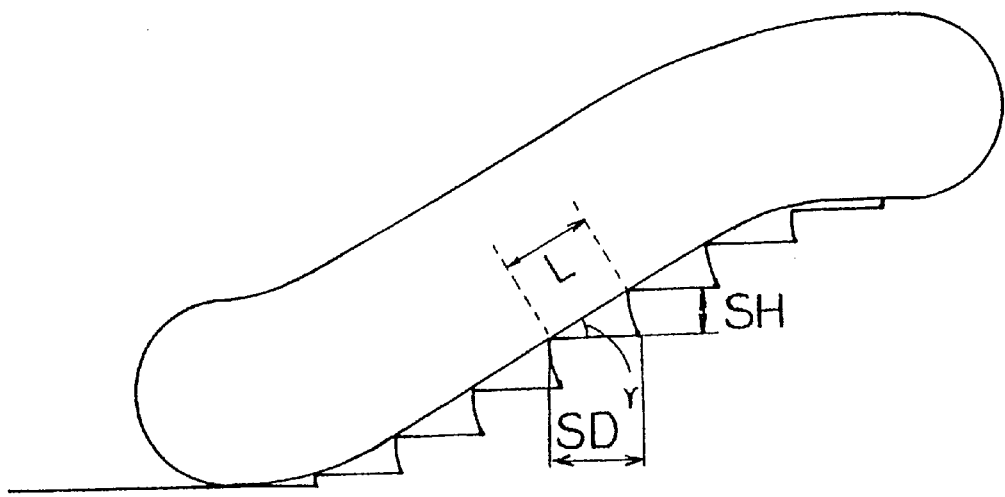
FIG. 4 is a side schematic representation of movable steps of an escalator.

It can be generally assumed that most of the ascending and descending escalators, such as that shown in FIG. 4, differ from each other only in the movement direction of the step surfaces, and therefore do not differ from each other in the maximum inclination angle and the distance between the corners of the neighboring step surfaces since escalators are usually standardized in size and configuration. Therefore, it is desired to establish the following relationships in which the diameter D is 200 mm, $\gamma$ represents the maximum inclination angle of the escalator, L represents the distance between the corners of the neighboring step surfaces, SH represents a vertical height between the neighboring step surfaces exhibiting the maximum inclination angle $\gamma$ and SD represents the horizontal depth of the step surface:

L<WB<2L+230

100<A<SD−100

10<B<SD $\gamma$−7<$\alpha$<$\gamma$+13

$\gamma$−12<$\beta$<$\gamma$

In the above relationships, upper and lower limits $\alpha$max and $\alpha$min of the angle $\alpha$ are calculated by the following formulas (1) and (2), respectively, and a lower limit $\beta$min of the angle $\beta$ is calculated from the following formula (3).

$$\alpha max = \tan^{-1}\{2SH/(2SH/\tan\gamma - SD + D/2\tan\theta + D/2\sin\theta)\} \quad (1)$$

where $\theta = \tan^{-1}\{SH/(SD - SH/\tan\gamma)\}$ $$\alpha min = \tan^{-1}\{2SH/(2SH/\tan\gamma + SD - D/2\tan\theta - D/2\sin\theta)\} \quad (2)$$

where $\theta = \tan^{-1}\{SH/(SD - SH/\tan\gamma)\}$ $$\beta min = \tan^{-1}\{SH/(SH/\tan\gamma + SD - D/2\tan\theta - D/2\sin\theta)\} \quad (3)$$

where $\theta = \tan^{-1}\{SH/(SD-SE/\tan\gamma)\}$

More specifically, according to the provision relating to the escalator (the Building Standards Act 129-11), the maximum inclination angle γ must be 30 degrees or less, and a relationship of γ=30°, SH=200 mm and SD=400 mm are generally employed as standard specifications. By assigning the above standard values into the aforementioned formulas (1), (2) and (3), the relationship of αmax=43°, αmin=23° and βmin=18° is obtained, leading to the aforementioned inequalities for determining the angle.

Therefore, when the front and rear wheels 2 and 3 have the diameter D of 200 mm, the relationship of wheel base WB=620 mm, distance A=104 mm, distance B=45 mm, angle α=39° and angle β=24° is most preferable. It should be noted that the above standards are for Japanese escalators. Similar standards exist in the U.S. and the dimensions above can be easily modified to fit the corresponding U.S. standards.

Figure 5A:
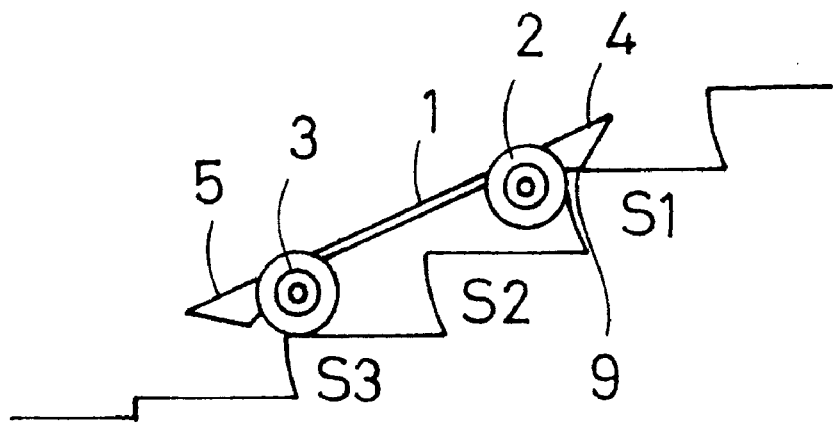
FIGS. 5A and 5B are schematic views showing the vehicle depicted in FIGS. 1 and 2 on the steps of the escalator depicted in FIG. 4, with the steps undergoing ascending movement.
Figure 5B:
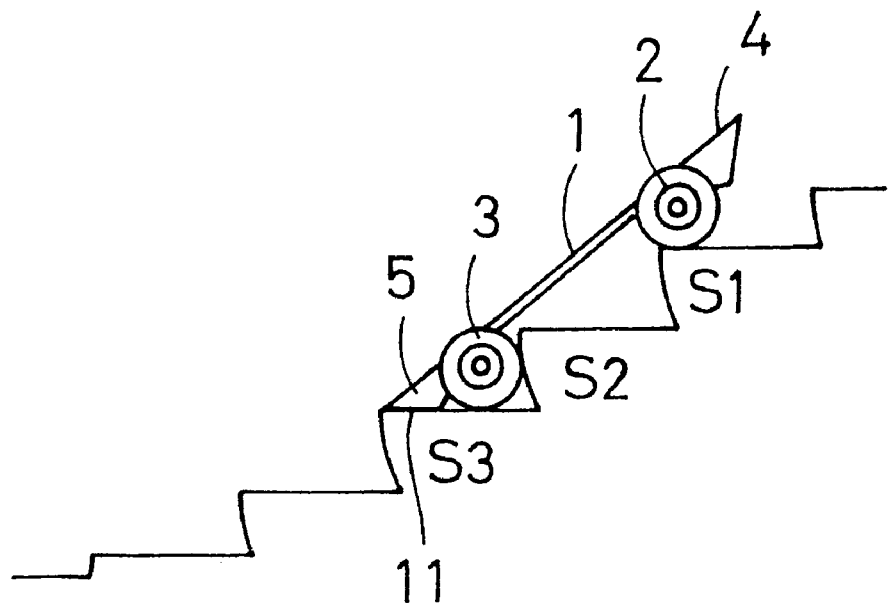

By setting the parameters in the above ranges, the first landing surface 9 of the front supports 4 can land on a step surface S1 at the maximum inclination portion of the escalator, and simultaneously the rear wheels 3 can land on a step surface S3 as shown in FIG. 5(A). When the front wheels 2 land on the step surface S1 as shown in FIG. 5(B), the first landing surface 11 of the rear supports 5 can land on the step surface S3.

Figure 6A:
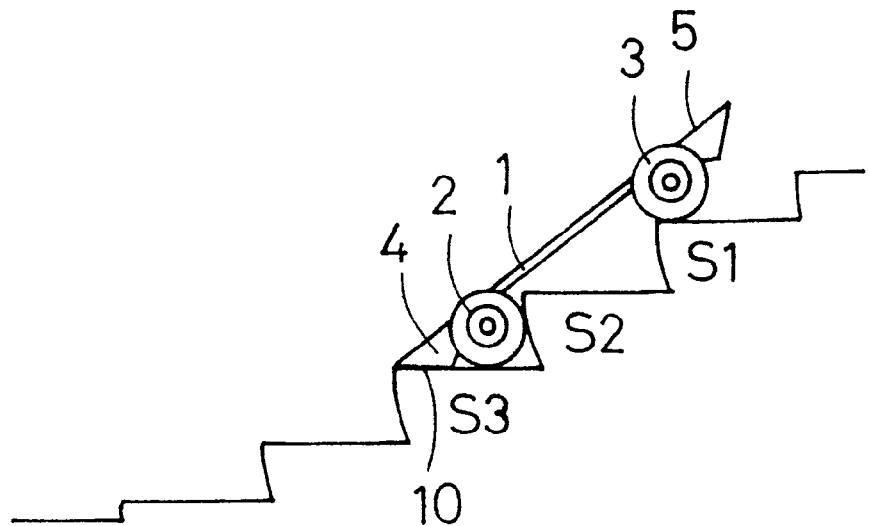
FIGS. 6A and 6B are schematic views showing the vehicle depicted in FIGS. 1 and 2 on the steps of the escalator depicted in FIG. 4, with the steps undergoing descending movement.
Figure 6B:
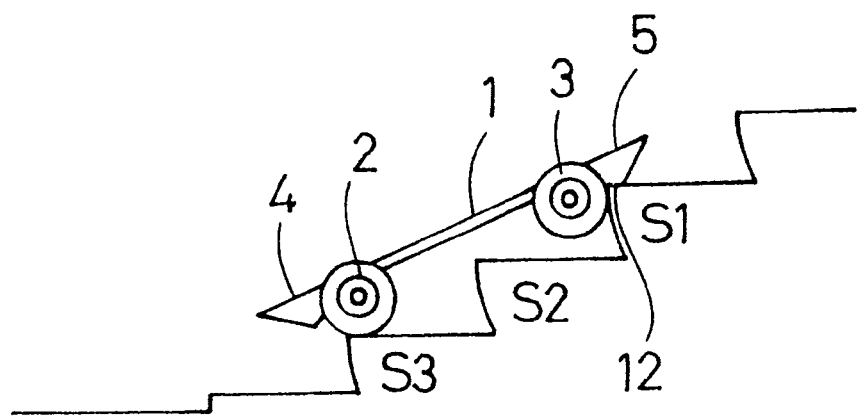

On the descending escalator, as shown in FIG. 6(A), the second landing surface 10 of the front support 4 can land on the step surface S3 at the maximum inclination portion of the escalator, and simultaneously the rear wheels 3 can land on the step surface S1. When the front wheels land on the step surface S3 as shown in FIG. 6(B), the second landing surface 12 of the rear support 5 can land on the step S1. In the above landing manner, the front or rear wheels are always on one step, so that the vehicle can rapidly move away from the escalator.

The specific structure of the supports is described below. Since both the supports 4 and 5 have substantially the same structure, only the front support 4 will now be specifically described below with reference to FIGS. 7 to 10. However, it should be appreciated that the description of the front supports 4 also applies specifically to corresponding features of the rear supports 5.

The front support 4 has a main frame 20 fixed to the front end of the vehicle body 1, an intermediate frame 21 supported on the main frame 20 and a landing portion 22 pivotally supported by the intermediate frame 21. The front supports 4 also have cylindrical elastic members 23, 24a and 24b made of urethane rubber for absorbing shock upon impact with a step or other object. The elastic member 23 is arranged between the main frame 20 and the intermediate frame 21. The elastic members 24a and 24b are arranged between the intermediate frame 21 and the landing portion 22. The elastic member 23 is provided for absorbing a shock acting perpendicular on the vehicle body 1. The elastic member 24a is provided for absorbing a shock acting perpendicular onto the first landing surface 9, and the elastic member 24b is provided for absorbing a shock acting perpendicular to the second landing surface 10.

The main frame 20 is formed with a seat plate 25 that is fastened to the vehicle body 1 and a C-shaped frame member 26 that is welded to the seat plate 25. The C-shaped frame member 26 is open facing downward. The frame member 26 is provided at its upper surface with two laterally spaced circular apertures 26a. A flanged bushing 27 extends through each aperture 26a. Guide shafts 28a and 28b vertically slidably extend through the two flanged bushings 27, respectively. Ends of the guide shafts 28a and 28b are screwed into apertures in the intermediate frame 21. The elastic member 23 is disposed around one of the guide shafts, specifically, the shaft 28a. The upper end of the elastic member 23 extends around a portion of the flanged bushing 27. The lower end of the elastic member 23 contacts the intermediate frame 21. Owing to this structure, the intermediate frame 21 may move vertically toward the main frame 20 by compressing the elastic member 23.

Figure 10:
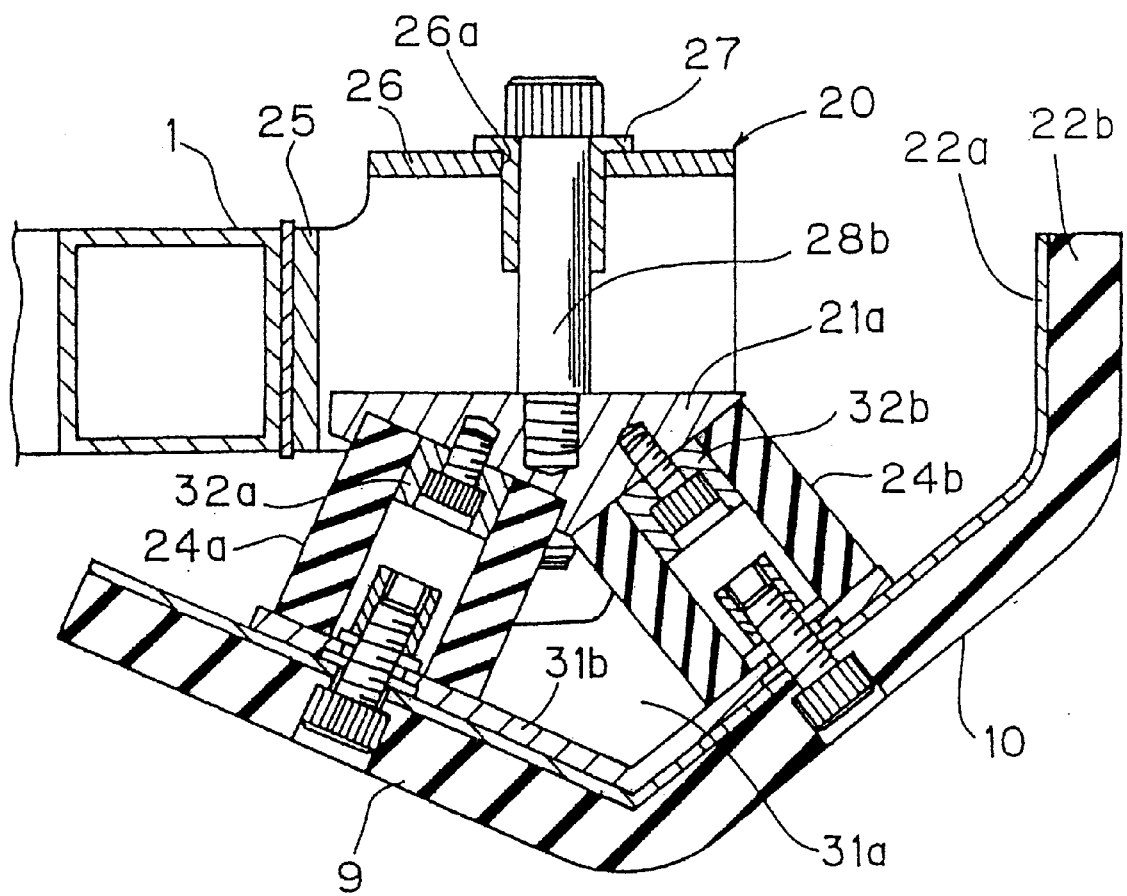
FIG. 10 is a cross sectional view taken along line X—X in FIG. 8.

The intermediate frame 21 is a plate member, and is provided at a middle portion thereof with an attachment portion 21a, shown in FIG. 10, which has a triangular shape when viewed in cross section and is provided for attaching the elastic members 24a and 24b. Swing shafts 30 are inserted into the opposite side portions of the intermediate frame 21 for swingably carrying the landing portion 22, respectively.

Figure 7:
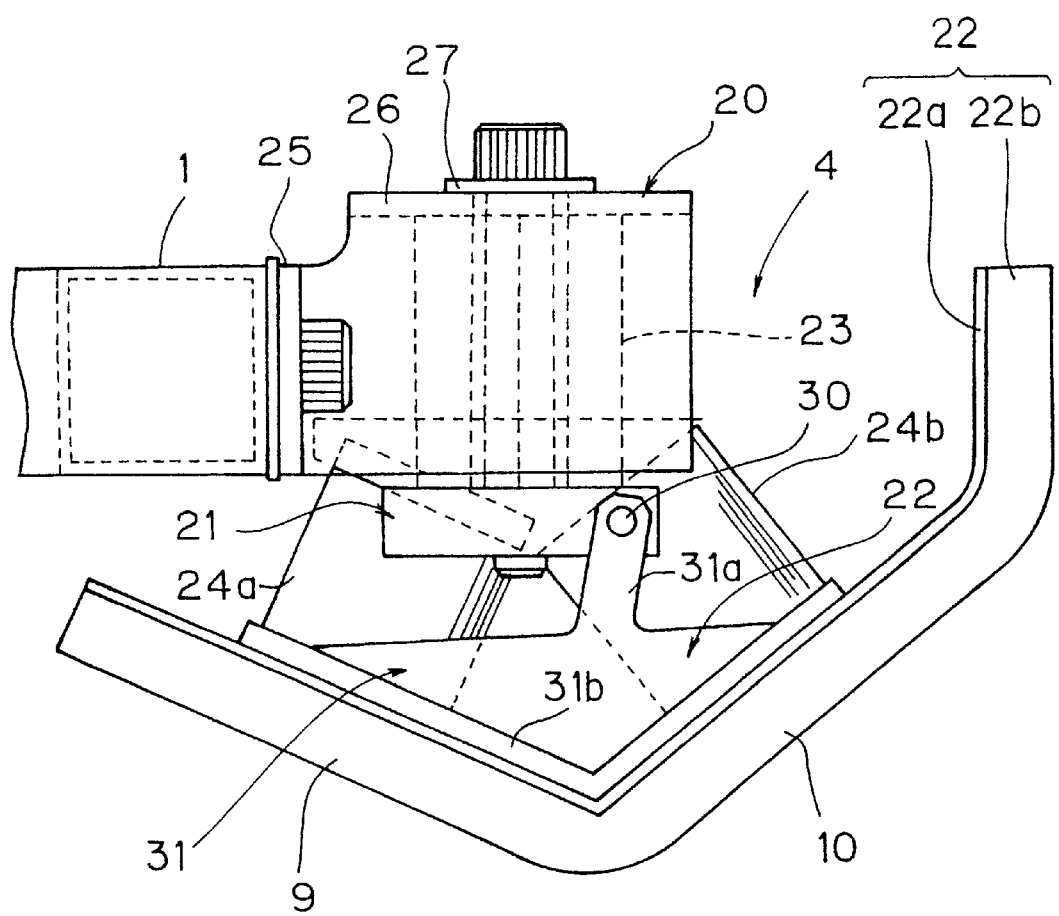
FIG. 7 is a side view of a front support of the vehicle depicted in FIGS. 1 and 2, shown on an enlarged scale.
Figure 8:
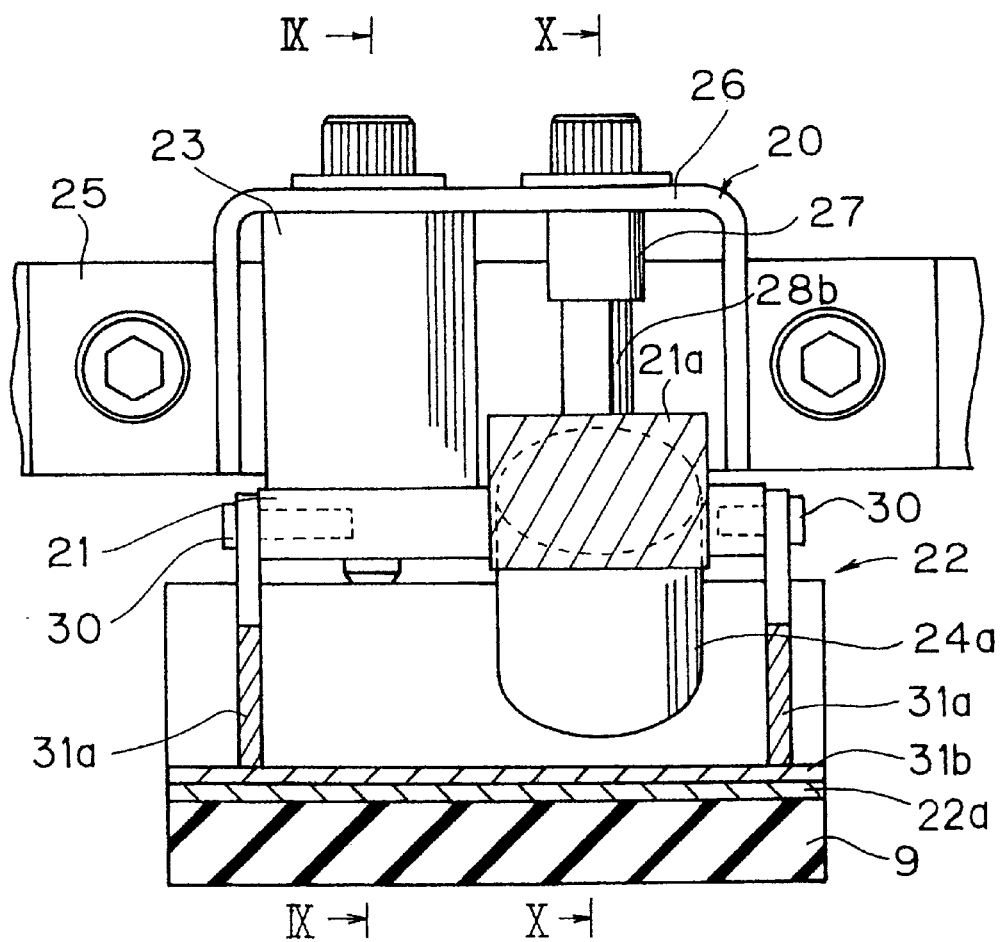
FIG. 8 is a part cross-sectional view, part front elevational view of the front support depicted in FIG. 7.
Figure 9:
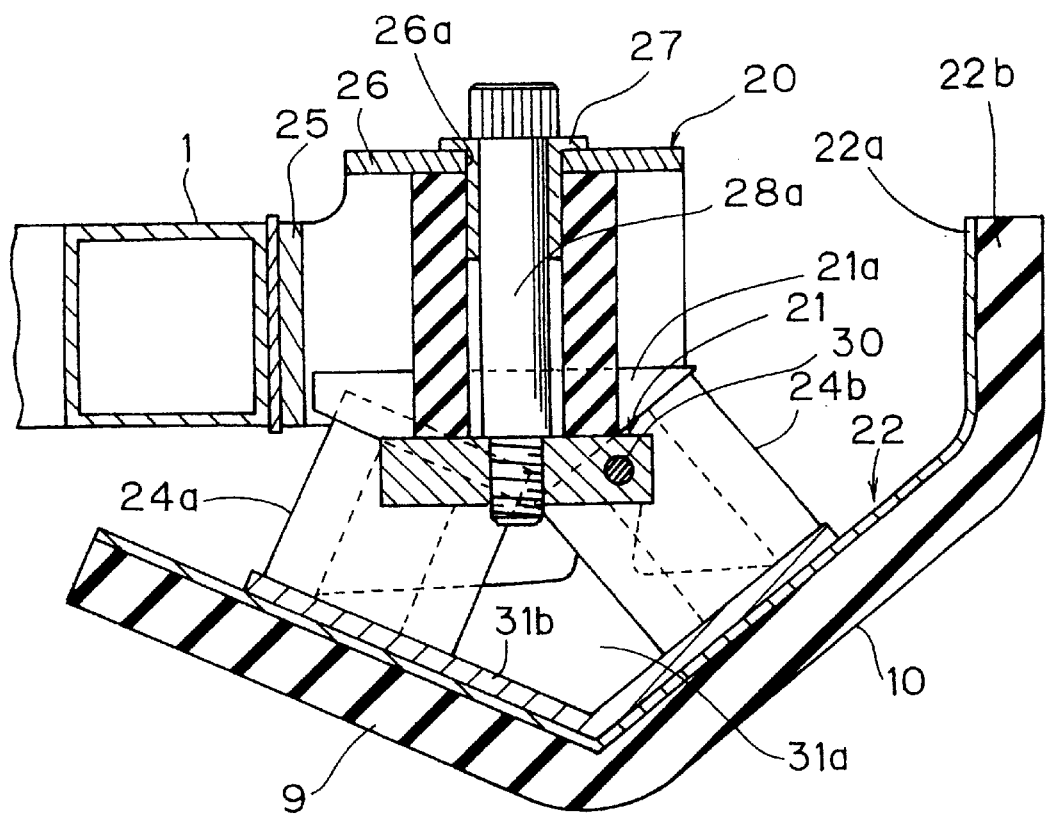
FIG. 9 is a cross sectional view of the front support taken along line IX—IX in FIG. 8.

The landing portion 22, shown in a side view in FIG. 7, includes a plate 22a and an elastic member 22b which is made of, for instance, urethane rubber or similar resilient material. The elastic member 22b is fixed to the lower surface of the plate 22a. The landing portion 22 has defined thereon the first landing surface 9 at the rear portion of the bottom surface and the second landing surface 10 at the front portion thereof. These landing surfaces 9 and 10 are continuous with respect to one another, and define the angle α of 39° and the angle β of 24° with respect to the horizontal plane, respectively.

The plate 22a of the landing portion 22 is fixed to a swing arm 31. The swing arm 31 has a pair of left and right arms 31a pivotally carried by swing shafts 30 which extend into the intermediate frame 21. The swing arm 31 also includes a seat plate 31b which is arranged at the lower end of the arms 31a and is bent to conform to the shape of the plate 22a and the landing surfaces 9 and 10. The elastic members 24a and 24b are arranged between the seat plate 31b and the attachment portion 21a of the intermediate frame 21.

The upper ends of the elastic members 24a and 24b are fitted into cylindrical members 32a and 32b fastened to the lower surface of the attachment portion 21a, respectively. The lower ends of the elastic members 24a and 24b are seated on the seat plate 31b.

As described above, the structure is provided with the elastic members 24a, 24b and 23 for absorbing the shock in the three directions perpendicular to the landing surfaces 9 and 10 and the vehicle body, respectively. Therefore, shocks directed to any portion of the landing surfaces 9 and 10 can be absorbed so that comfortable riding quality can be maintained even when the vehicle suddenly lands on a step surface during moving onto an escalator.

Figure 11:
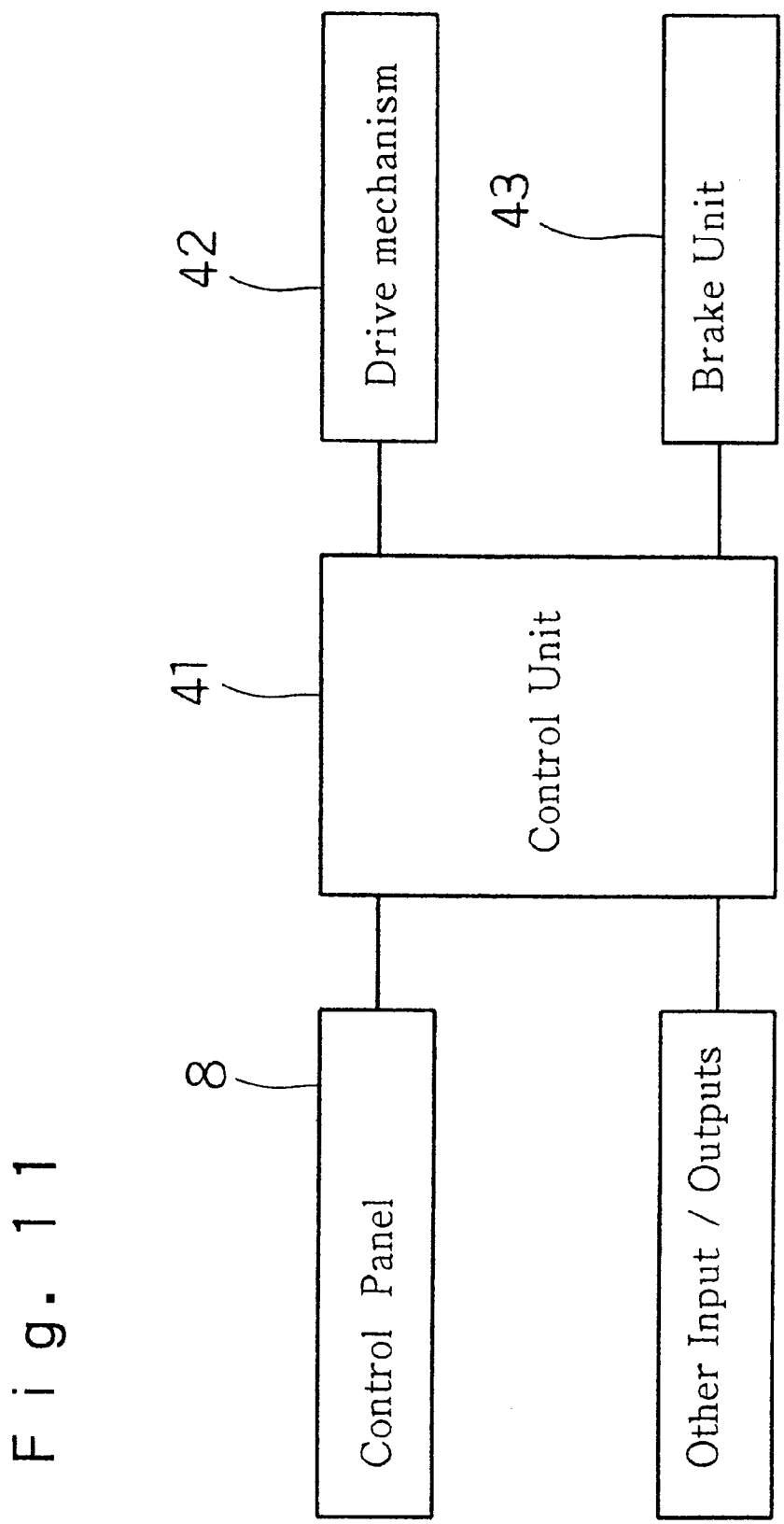
FIG. 11 is a control block diagram of the operation of the powered vehicle depicted in FIGS. 1 and 2.

The powered vehicle is provided with a control unit 41 shown in FIG. 11. The control unit 41 is provided with a microcomputer including a CPU, a ROM, a RAM and other elements. The control unit 41 is connected to the control panel 8, a drive mechanism 42 for driving the rear wheels 3, a brake unit 43 for braking and other input/output terminals.

Description will be given on an operation of the vehicle when it moves onto the ascending escalator.

Figure 12:
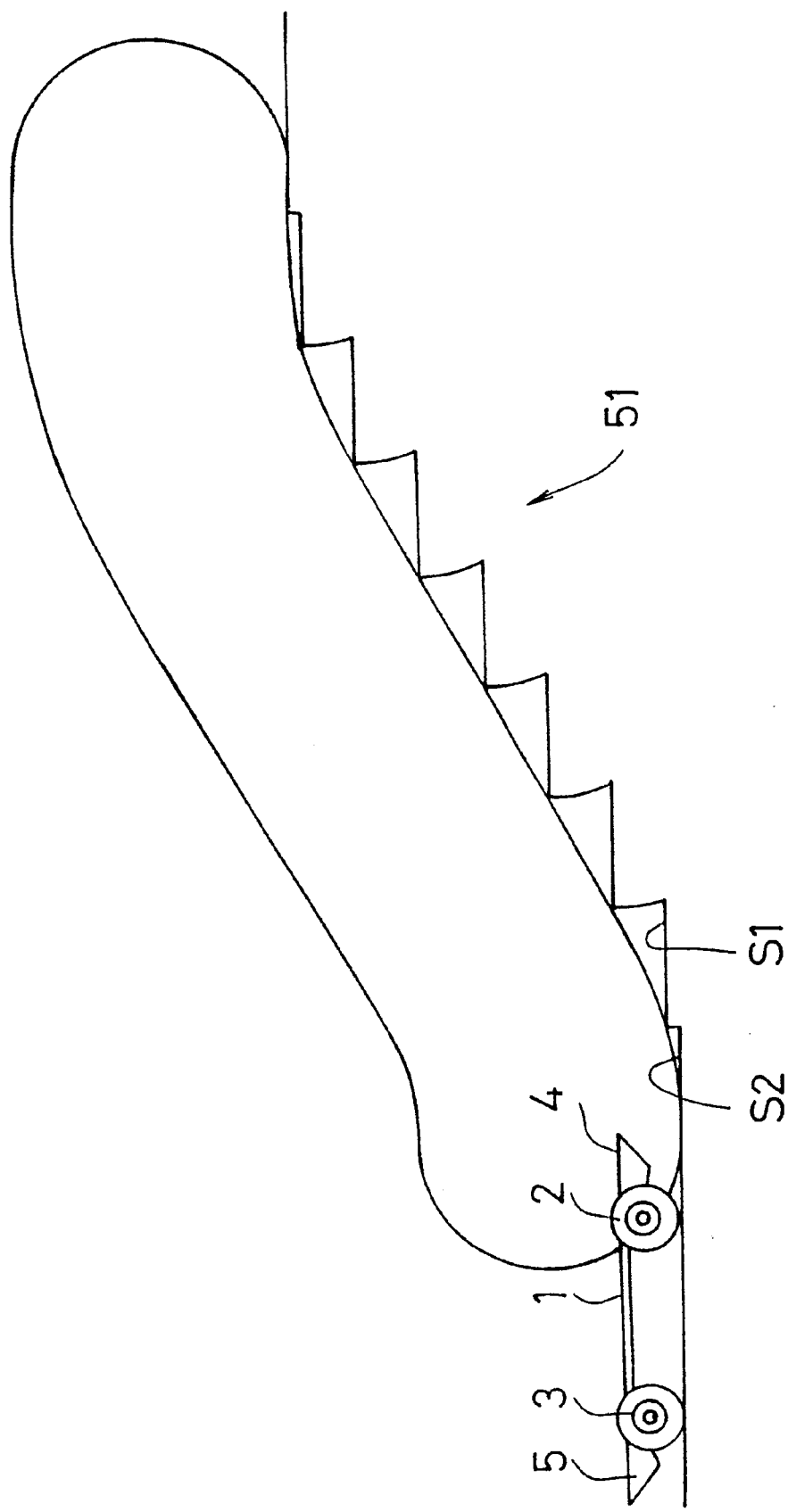
FIG. 12 is a diagram showing operation of the powered vehicle depicted in FIGS. 1 and 2 with respect to movement onto an ascending escalator.

As shown in FIG. 12, the vehicle may move toward the leading end of an ascending escalator 51, and then further moves forward until the front wheels 2 are located on the step surface S2. At this state, the drive mechanism 42 drives the rear wheels 3 for forward movement at the substantially same speed as the step surface of the escalator 51. Since the step surface S1 moves toward the upper right portion of the figure at a constant rate, the front wheels 2 begin to move toward the upper right position in the figure, and at the same time the vehicle body 1 is gradually inclined, raising the front right end thereof.

Figure 13:
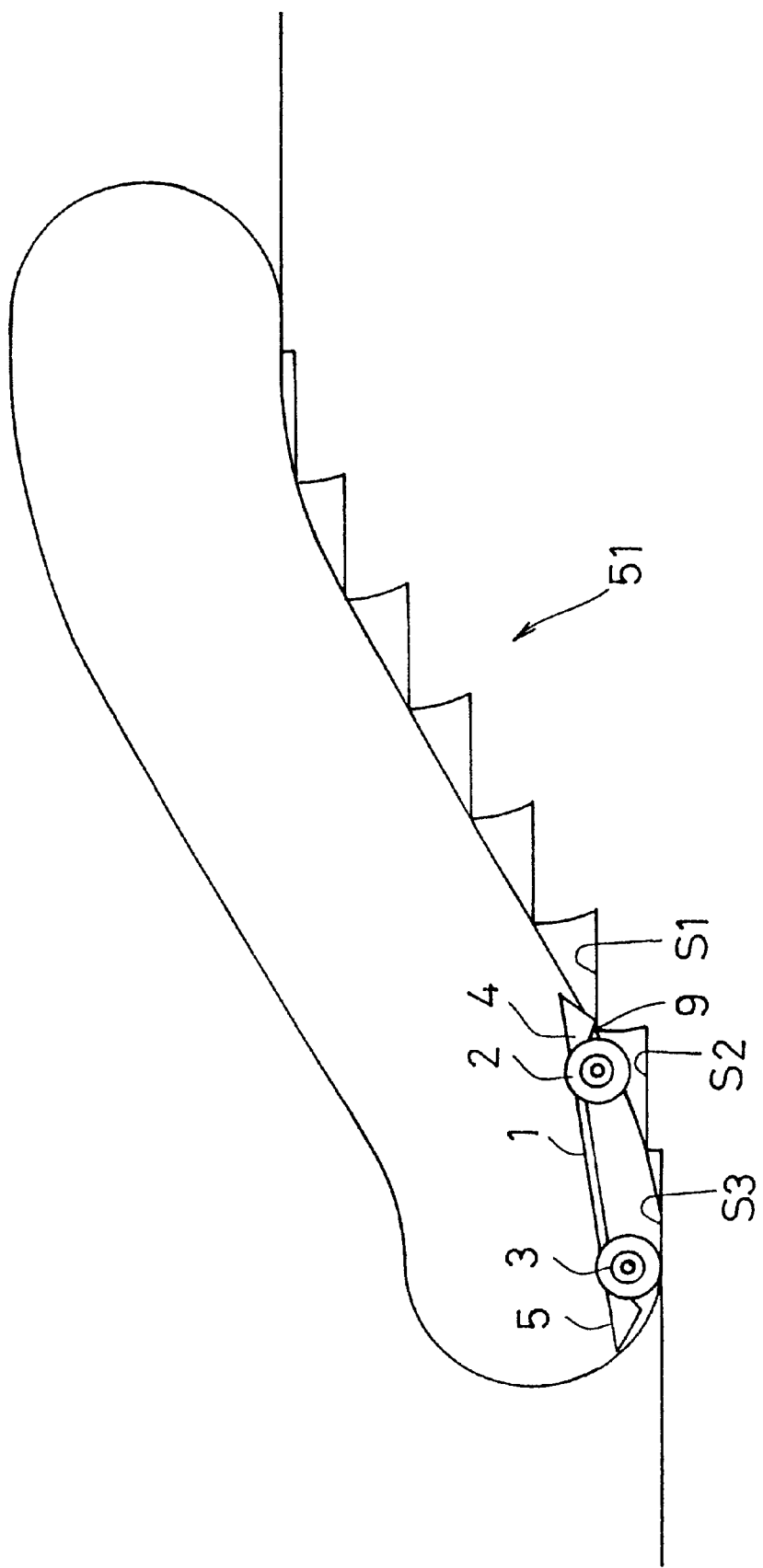
FIG. 13 is a diagram showing further operation of the powered vehicle depicted in FIGS. 1 and 2 with respect to movement onto the ascending escalator.

When the rear wheels 3 reach the step surface S3 and the front wheels 2 reach the corner at the step surface S1 as shown in FIG. 13, the brake unit 43 is operated to stop the vehicle body 1. Thereby, the first landing surface 9 of each front support 4 lands on the step surface S1 as the step surface S1 rises. When the first landing surface 9 lands on the step surface S1, the elastic member 24a is compressed and deformed, and thereby the elastic member 24b is deformed in a shearing manner, so that the shock caused by the landing is absorbed. When the front wheels 2 are spaced upward from the step surface S2, the elastic member 23 is compressed and deformed. Since the elastic members 23, 24a and 24b are arranged in the aforementioned manner, it is possible to absorb not only the shock at the time of landing but also the shock which may be caused if the vehicle falls onto a neighboring step during movement onto the escalator.

Figure 14:
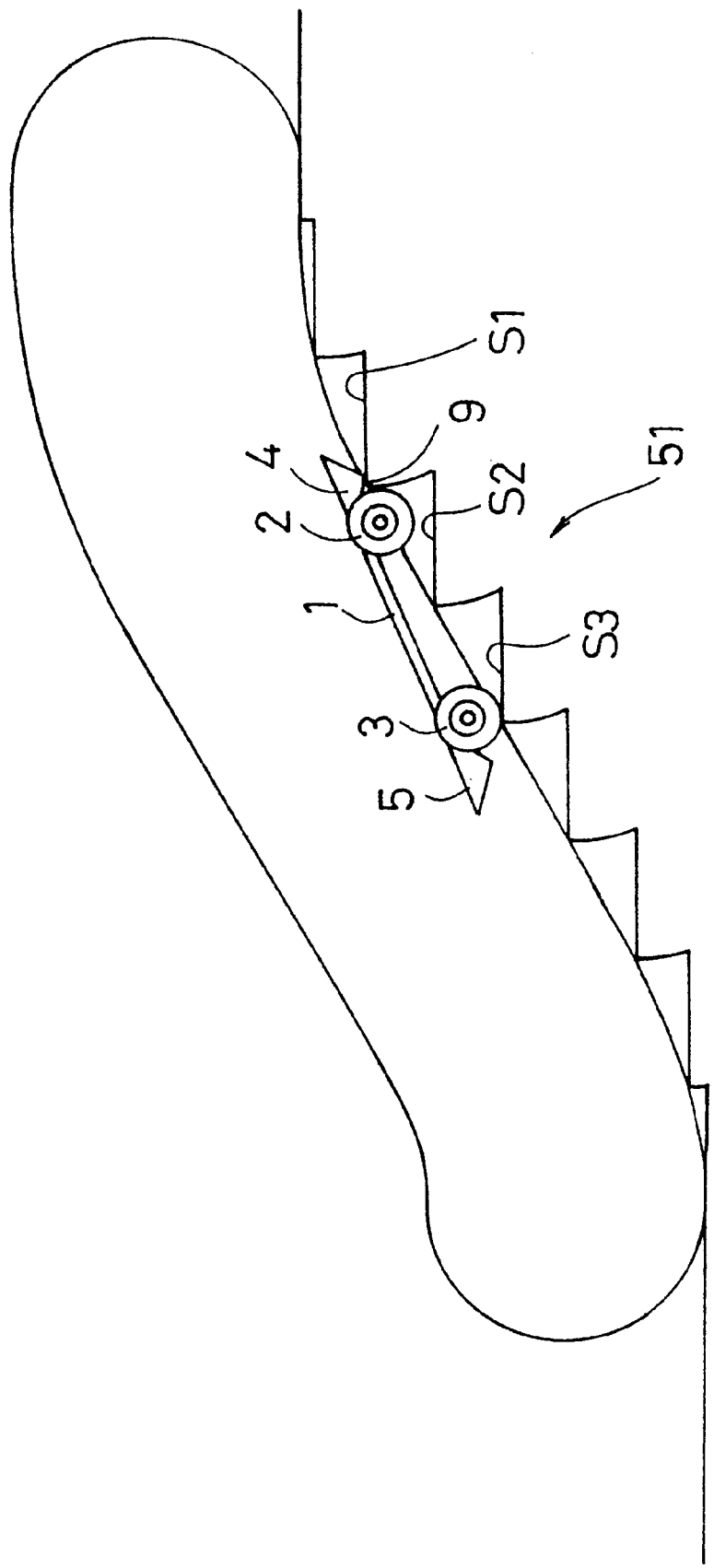
FIG. 14 is a diagram showing the powered vehicle depicted in FIGS. 1 and 2 on the ascending escalator.

At a middle portion of the escalator 51, the vehicle achieves a maximum inclination angle, as shown in FIG. 14. In this state, the first landing surface 9 of the front support 4 lands on the step surface S1, and each rear wheel 3 lands on the step surface S3. In this state, the vehicle is stably carried upward by the escalator.

As the vehicle reaches the upper end section of the escalator 51, the inclination angle gradually decreases, and the inclination of the vehicle body 1 decreases, so that the front wheel 2 lands on the step surface S2, and the first landing surface 9 of the front support 4 is spaced from the step surface S1. When the step surface S2 bearing the front wheels 2 reaches the uppermost position, the vehicle further moves forward as the step surface S3 bearing the rear wheels 3 moves, so that the front wheels 2 move away from the upper end of the escalator 51. When the step surface S3 bearing the rear wheels 3 reaches the upper end, the drive mechanism 42 drives the rear wheels 3 so that the vehicle can move away from the escalator 51.

An operation for riding on a descending escalator is described below.

Figure 15:
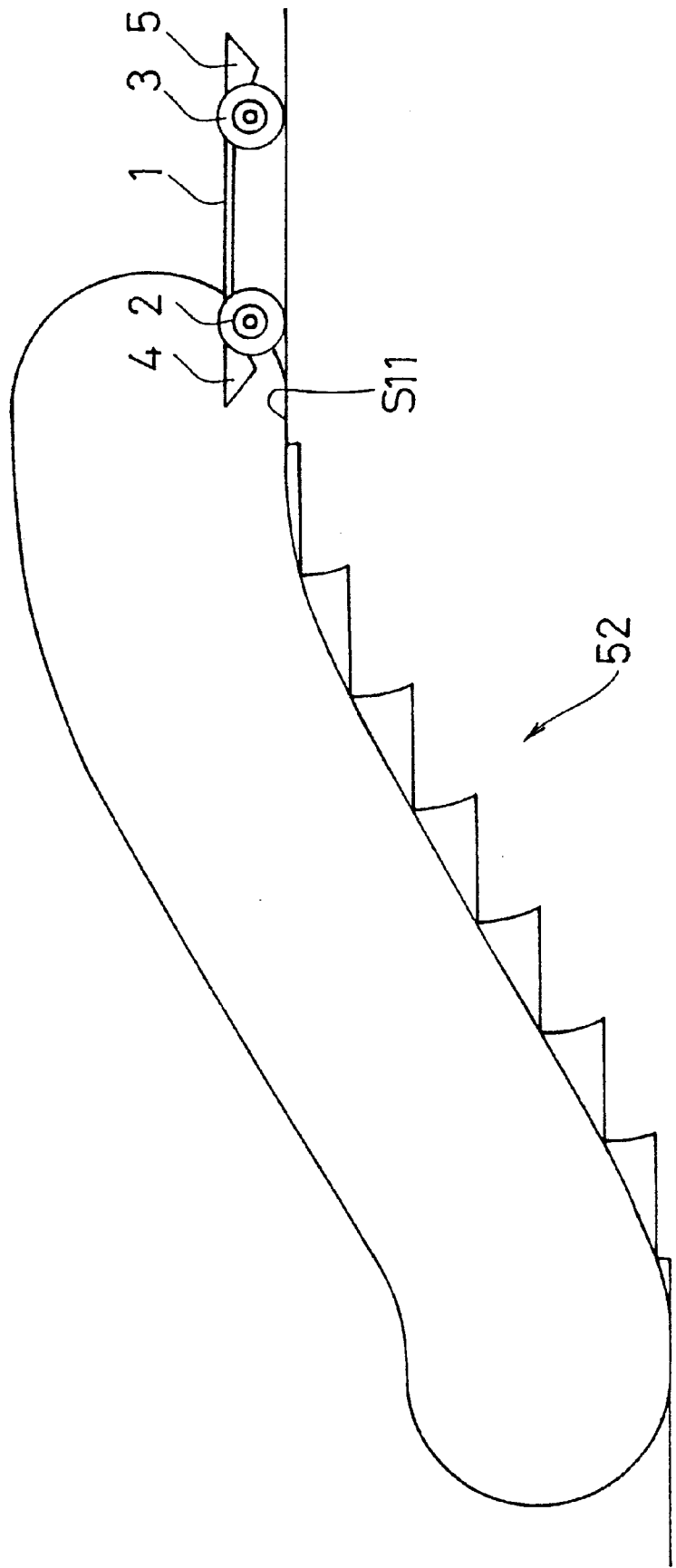
FIG. 15 is a diagram showing operation of the powered vehicle depicted in FIGS. 1 and 2 with respect to movement onto a descending escalator.

When the vehicle approaches an upper end of a descending escalator 52, as shown in FIG. 15, the vehicle body 1 is further moved forward to locate the front wheels 2 on a step surface S11. After the front wheels 2 move onto the step surface S11, the drive mechanism 42 drives the rear wheels 3 for forward movement at the substantially same speed as the step surface of the escalator 52. As the step surface S11 moves toward the lower left position in the figure with time, and the front wheels 2 move toward the lower left position in the figure, the vehicle body 1 gradually inclines so that a front end thereof is lowered.

When the rear wheels 3 reach a step surface S13, the brake unit 43 is operated to stop the vehicle body 1. After both the front and rear wheels 2 and 3 are located on the step surfaces of the escalator 52, the vehicle body 1 moves toward the lower left position in FIGS. 15, 16 and 17 together with the moving step surfaces and increases its inclination as shown in FIG. 16.

Figure 16:
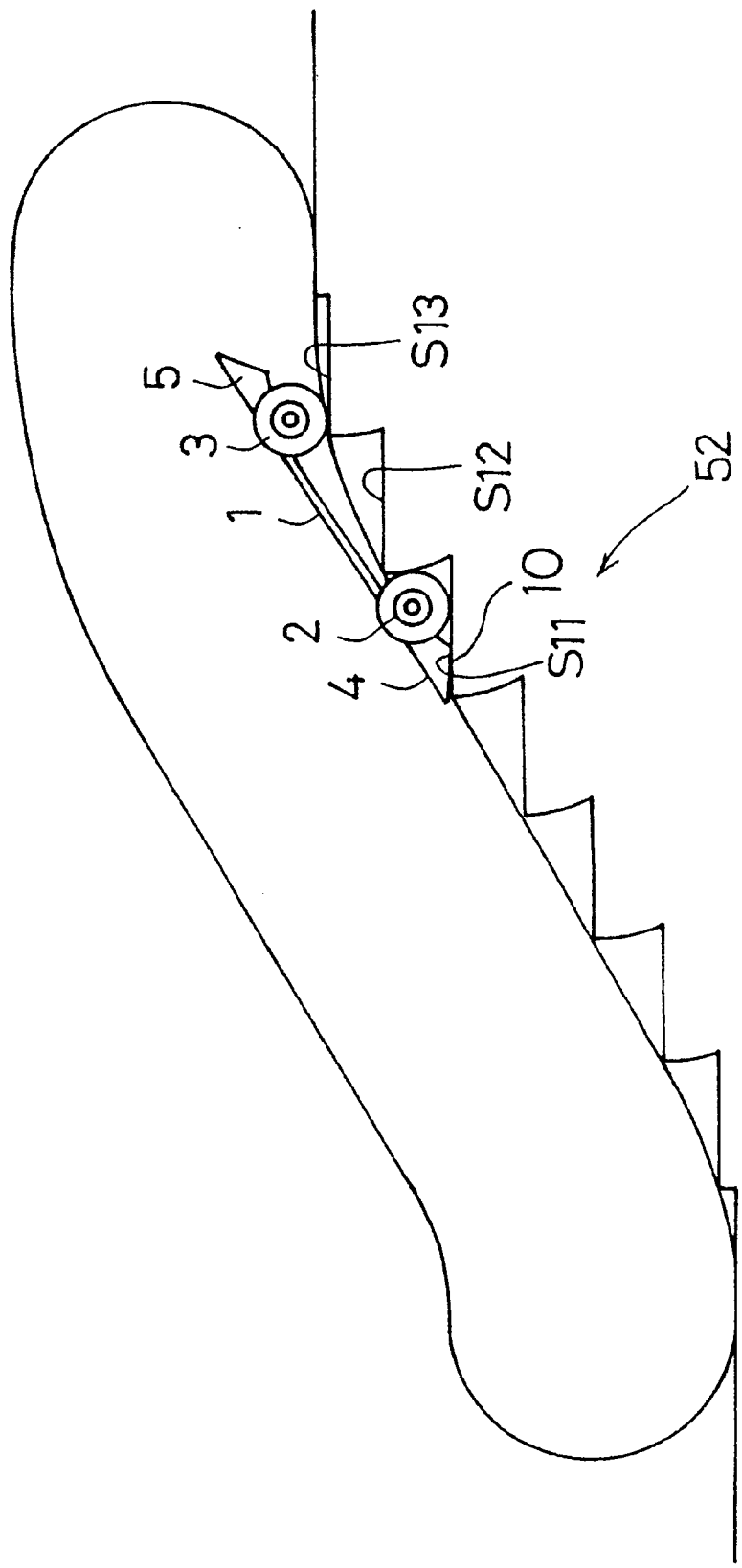
FIG. 16 is a diagram showing further operation of the powered vehicle depicted in FIGS. 1 and 2 with respect to movement onto the descending escalator.

When the vehicle moves to the intermediate portion of the escalator 52 exhibiting the maximum inclination angle as shown in FIG. 16, the vehicle body 1 also exhibits the maximum inclination, so that the second landing surface 10 of each front support 4 lands on the step surface S11, and each rear wheel 3 lands on the step surface S13. At this time, the elastic members 23, 24a and 24b are compressed and deformed in a shearing manner to absorb the shock similarly to the aforementioned case.

At the vicinity of the lower end of the escalator 52, the inclination angle gradually decreases and therefore the inclination of the vehicle body 1 also decreases, so that the front wheels 2 land on the step surface S11 as shown in FIG. 17, and the second landing surface 10 of the front support 4 moves away the step surface S11.

When the step surface S11 bearing the front wheels 2 moves to the lowermost position, the rear wheels 3 further move forward together with the step surface S13 bearing the rear wheels 3, so that the front wheels 2 move away from the trailing end of the escalator 52. When the step surface S13 bearing the rear wheels 3 reaches the lowermost position, the drive mechanism 42 drives the rear wheels 3 for moving the vehicle away from the escalator 52.

It should be understood from the depictions in FIGS. 16 and 17 and the above description, that the front and rear supports 4 and 5 are configured such that there is engagement between the step surfaces S11 and S13 and the rear and front supports 5 and 4, respectively. However, a step surface S12 between the step surfaces S11 and S13 is not contacted by the powered vehicle. The length between the front and rear supports 4 and 5, extending over the step surface S12, adds stability to the power vehicle during movement with the step surfaces S11 and S13.

The powered vehicle of the embodiment of the invention can ride stably and reliably on the step surfaces of the escalator, and can provide a high safety with a simple structure.

OTHER EMBODIMENTS (A) Although the rear wheels are driven in the aforementioned embodiment, the vehicle may have a front-wheel-drive system or an all-wheel-drive system.

(B) The front and rear supports 4 and 5 may have configurations other than those in the aforementioned embodiment, and may have arc-shaped configurations or the like.

(C) The front and rear supports 4 and 5 may be vertically movable, so that they may be located in upper retracted positions during ordinary operation, and may be lowered for landing on the step surface when the vehicle is to be moved onto an escalator.

(D) The elastic members for absorbing the shock may be formed of members such as coil springs rather than being made of urethane rubber.

(E) The positions of the supports are not restricted to the front and rear positions of the vehicle body, and they may be arranged at the lower and/or side portions of the vehicle body.

According to the powered vehicle of the invention, the front or rear supports land on the step surface and the wheels remote from the landed support also land on the step surface, so that the vehicle can stably and safely ride on the escalator. Further, the front or rear wheels are always on the step, so that the vehicle can rapidly move away from the escalator.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A powered vehicle capable of riding on a plurality of steps of an escalator, comprising:

a vehicle body;

a plurality of wheels, said wheels including a pair of front wheels disposed at a front portion of said vehicle body and a pair of rear wheels disposed at a rear portion of said vehicle body, respectively;

drive means for driving at least one pair of said pairs of front and rear wheels;

front supports fixed to front portions of said vehicle body in front of said front wheels;

rear supports fixed to rear portions of said vehicle body behind said rear wheels, said front and rear supports being configured such that one of said front and rear supports is brought into contact with a step surface of an escalator when said vehicle body is inclined at a maximum inclination portion of the escalator;

wherein in response to one of said front and rear supports being brought into contact with the step surface of the escalator a pair of said wheels adjacent to the other of said front and rear supports contacts another step surface of the escalator with said vehicle body inclined at the maximum inclination portion of said escalator; and wherein each of said front and rear supports includes a first landing portion configured for contact with a step surface of an ascending escalator, and a second landing portion configured for contact with a step surface of a descending escalator.

2. The powered vehicle according to claim 1, wherein each of said first and second landing portions of said front and rear supports includes a shock absorbing mechanism for absorbing shock.

3. A powered vehicle capable of riding on a plurality of steps of an escalator inclined at least at a maximum inclination portion of said escalator, comprising:

a vehicle body;

front and rear wheels arranged at front and rear portions of said vehicle body, respectively;

drive means for driving at least one of said front and rear wheels;

a support configured for contact with a step surface of an escalator with said vehicle body inclined on a maximum inclination portion of the escalator;

shock absorbing means disposed within said support for absorbing shock caused by contact between said support and the escalator; and wherein said support includes a first landing portion configured for contacting a step surface of an ascending escalator, and a second landing portion configured for contacting a step surface of a descending escalator.

4. The powered vehicle according to claim 3, wherein said shock absorbing means comprises:

a first shock absorber for absorbing a shock applied substantially perpendicularly to said vehicle body;

a second shock absorber for absorbing a shock applied substantially perpendicular to said first landing portion; and a third shock absorber for absorbing a shock applied substantially perpendicular to said second landing portion.

5. A powered vehicle capable of riding on a plurality of steps of an escalator inclined at least at a maximum inclination portion of said escalator, comprising:

a vehicle body;

front and rear wheels arranged at front and rear portions of said vehicle body, respectively;

drive means for driving at least one of said front and rear wheels;

at least one support configured for contact with a step surface of a moving escalator with said vehicle body inclined on a maximum inclination portion of the escalator;

shock absorbing means disposed within said support for absorbing shock caused by contact between said support and the escalator;

wherein said at least one support comprises:

a front support disposed on a front portion of said vehicle body in front of said front wheel, said front support having a landing portion configured for contacting a step surface of the moving escalator and wherein said rear wheel is configured to simultaneously contact another step surface of the escalator with said vehicle body inclined on the maximum inclination portion of the escalator; and a rear support disposed on a rear portion of said vehicle body in back of said rear wheel, said rear support having a landing portion configured for contacting a step surface of the moving escalator and wherein said front wheel is configured to simultaneously contact another step surface of the escalator with said vehicle body inclined on the maximum inclination portion of the escalator, and at least one of said front and rear supports includes a second landing portion configured for contacting a step surface of an ascending escalator.

6. The powered vehicle according to claim 5, wherein said shock absorbing means has a first shock absorber for absorbing a shock applied substantially perpendicular to said vehicle body, a second shock absorber for absorbing a shock applied substantially perpendicularly to said landing portion of said front support, and a third shock absorber for absorbing a shock applied substantially perpendicularly to said landing portion on said rear support.

* * * * *